United States Patent
Mirsky (10) Patent No.: US 10,616,085 B2
(45) Date of Patent: Apr. 7, 2020

(54) RESIDENCE TIME MEASUREMENT FOR OPTIMIZING NETWORK SERVICES

(71) Applicant: ZTE Corporation, Shenzhen (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 294 days.

(21) Appl. No.: 15/692,709

(22) Filed: Aug. 31, 2017

(65) Prior Publication Data

US 2019/0068470 A1 Feb. 28, 2019

(51) Int. Cl.
*H04L 12/26* (2006.01)
*H04L 12/24* (2006.01)

(52) U.S. Cl.
CPC ...... *H04L 43/0852* (2013.01); *H04L 41/5009* (2013.01); *H04L 41/5035* (2013.01); *H04L 43/106* (2013.01); *H04L 43/16* (2013.01)

(58) Field of Classification Search
CPC . G06F 2009/45595; G06F 2009/45587; G06F 21/53; G06F 21/575; G06F 2221/034; G06F 21/10; G06F 9/4416; G06F 9/45533; G06F 9/5077; G06F 2009/4557; G06F 9/455; G06F 9/547; G06F 16/24542; G06F 16/256; G06F 17/27; G06F 2009/45562; G06F 2009/45579; G06F 21/31; G06F 21/44; G06F 21/45; G06F 21/57; G06F 21/60; G06F 21/606; G06F 21/6245; G06F 9/00; G06F 9/3877; G06F 9/4411; G06F 9/5005; G06F 9/5061; G06F 9/544; G06F 9/45558
See application file for complete search history.

(56) References Cited

U.S. PATENT DOCUMENTS

| | | |
|---|---|---|
| 5,251,204 A | 10/1993 | Izawa et al. |
| 7,778,171 B2 | 8/2010 | Bedrosian |
| 8,416,763 B1 | 4/2013 | Montini et al. |
| 2004/0218535 A1 | 11/2004 | Liong et al. |
| 2005/0149531 A1 | 7/2005 | Srivastava |
| 2006/0171346 A1 | 8/2006 | Kolavennu et al. |
| 2012/0163191 A1 | 6/2012 | Tokimizu et al. |
| 2014/0043992 A1 | 2/2014 | Le Pallec et al. |

(Continued)

FOREIGN PATENT DOCUMENTS

| | | |
|---|---|---|
| CN | 101499957 A | 8/2009 |
| CN | 103155488 A | 6/2013 |
| WO | 2016070947 A1 | 5/2016 |

OTHER PUBLICATIONS

Awduche, D., et al., "RSVP-TE: Extensions to RSVP for LSP Tunnels," The Internet Society, Network Working Group, RFC 3209, pp. 1-61, Dec. 2001.

(Continued)

*Primary Examiner* — Djenane M Bayard
(74) *Attorney, Agent, or Firm* — Perkins Coie LLP (57) ABSTRACT

Understanding the performance of a Service Function Chain (SFC) and how Virtual Network Functions (VNFs) contribute to the performance of the SFC can assist in the maintenance of services and quality of experience the VNFs are expected to provide. In an exemplary embodiment, a residence time of packets traversing a service function or virtual network function is measured. The residence time characterizes the processing delay a service function introduces into a network.

25 Claims, 7 Drawing Sheets

(56) References Cited

U.S. PATENT DOCUMENTS

| | | | |
|---|---|---|---|
| 2014/0092922 | A1 | 4/2014 | Le Pallec et al. |
| 2014/0237086 | A1* | 8/2014 | Legallais ......... H04N 21/21805 709/219 |
| 2016/0112182 | A1 | 4/2016 | Karnes |
| 2016/0323165 | A1* | 11/2016 | Boucadair ............... H04L 43/12 |
| 2017/0019334 | A1* | 1/2017 | Meng .................. H04L 12/6418 |
| 2017/0302548 | A1 | 10/2017 | Sarangapani et al. |
| 2017/0324497 | A1 | 11/2017 | Ruffini et al. |
| 2018/0077051 | A1 | 3/2018 | Nainar et al. |
| 2018/0097725 | A1 | 4/2018 | Wood et al. |
| 2018/0351874 | A1* | 12/2018 | Abhigyan ............... H04L 45/34 |
| 2019/0036804 | A1 | 1/2019 | Mihelic et al. |
| 2019/0081720 | A1 | 3/2019 | Barry et al. |
| 2019/0097908 | A1 | 3/2019 | Mirksy |

OTHER PUBLICATIONS

Filsfils, C., et al., "Segment Routing Architecture draft-ietf-spring-segment-routing-12," Internet Engineering Task =Force (IETF), Internet-Draft, pp. 1-28, Jun. 2017.

Giacalone, S., et al., "OSPF Traffic Engineering (TE) Metric Extensions," Internet Engineering Task Force (IETF), RFC 7471, pp. 1-19, Mar. 2015.

Hedman, P., "Description of Network Slicing Concept," NGMN 5G Project Requirements & Architecture—Work Stream E2E Architecture, Version 1.0, pp. 1-7, Jan. 2016.

Previdi, S., et al., "IS-IS Traffic Engineering (TE) Metric Extensions," Internet Engineering Task Force (IETF), RFC 7810, pp. 1-18, May 2016.

Fioccola, G., et al., "Alternate Marking method for passive and hybrid performance monitoring," Internet-Draft, Network Working Group, Internet Engineering Task Force (IETF), 31 pages, Jun. 2017.

Halpern, J., et aL., "Service Function Chaining (SFC) Architecture," RFC 7665, Internet Engineering Task Force (IETF), 32 pages, Oct. 2015.

Mirsky, G., et al., "Performance Measurement (PM) with Alternate Marking Method in Service Function Chaining (SFC) Domain," Internet-Draft, SFC Working Group, Internet Engineering Task Force (IETF), 7 pages, Jun. 2017.

Quinn, P., et al., "Network Service Header," Internet-Draft, Service Function Chaining, Internet Engineering Task Force (IETF), 37 pages, Feb. 2017.

International Search Report and Written Opinion dated Nov. 21, 2018 for International Application No. PCT/CN2018/103292, filed on Aug. 30, 2018 (4 pages).

International Search Report and Written Opinion dated Jan. 8, 2019 for International Application No. PCT/CN2018/107766, filed on Sep. 26, 2018 (6 pages).

Du, Z., et al., "An Enhanced End-to-End Transparent Clock Mechanism with a Fixed Delay Ratio," IEEE Communications Letters, 15(8):872-874, Aug. 2011.

Mirsky, G., et al., "Residence Time Measurement in MPLS Networks", Internet Engineering Task Force (IETF) Request for Comments: 8169 Category: Standards Track, May 2017, ISSN: 2070-1721.

\* cited by examiner

RESIDENCE TIME MEASUREMENT FOR OPTIMIZING NETWORK SERVICES

TECHNICAL FIELD

The present disclosure relates to virtual network function and service function chaining.

BACKGROUND

Virtualization of service functions is fast growing technology that allows scaling to demand of customers using, for example, cloud technology. A service function is an application that provides data storage, manipulation, presentation, communication or other capability which may be implemented using client-server or peer-to-peer architecture based on network protocols.

The delivery of end-to-end service may require various service functions. The instantiation of a set of service functions and the steering of data traffic, such as packets or frames, through the set of service functions is known as Service Function Chaining (SFC). A service function chain includes a set of service functions and constraints that can be applied to packets and/or frames and/or flows selected as a result of classification. A service function can be responsible for specific treatment of received packets. Examples of service functions include firewalls, wide area network and application acceleration, Network Address Translation (NAT), HTTP Header Enrichment functions, and TCP optimizer.

A service function is one of elements that can form the SFC and it can provide adaptation and forwarding of data to and from the Virtual Network Function (VNF) instance. Control and management of a service function can be realized via either SFC control protocol in a distributed model or via a controller in a centralized model. Virtualization of service functions decouples the service functions from the hardware devices so that the service functions can run in software. A VNF can handle specific network functions that run on one or more virtual machines (VMs) on top of the hardware networking infrastructure, such as routers, and switches. A VNF can be designed to consolidate and deliver the networking components to support a fully virtualized infrastructure including virtual servers, storage, and even other networks. Individual virtual network functions can be connected or combined together as building blocks to offer a full-scale networking communication service.

SUMMARY

Apparatuses, methods, computer readable media, and systems are disclosed for optimizing network services. An exemplary embodiment discloses a method of packet communication. The exemplary method comprises determining, for a packet, a service function path comprising a set of one or more service functions (SFs) mapped to a service function forwarder (SFF), encapsulating the packet in a header, receiving information indicative of a requested residence time measurement for the packet, wherein the residence time provides information about time spend by the packet in each SF, inspecting, by the SFF, a mark field corresponding to the packet, reading, for each SF associated with the SFF, a first clock value as the packet is passed thereto, reading, for each SF associated with the SFF, a second clock value as the packet is received therefrom, and calculating, by the SFF, the residence time measurement of the packet in each SF as a function of the first clock value and the second clock value.

In some embodiments, the SFF calculates for each of the one or more SFs the residence time measurement of the packet by subtracting the first clock value from the second clock value. In some embodiments, the SFF sends to a pre-defined data collector the calculated residence time measurement of the packet, a description of each of the one or more SFs, a sequence number, and a timestamp. In some embodiments, the first clock value and the second clock value are read by the SFF from a wall clock. In some embodiments, the header is a network service header (NSH). In an exemplary embodiment, the mark field is located in the NSH. The exemplary method further comprises marking the packet, sending the packet with the marking from a Classifier to the SFF.

In some embodiments, the service function path comprising a second set of one or more service functions (SFs) mapped to a second service function forwarder (SFF), and the residence time measurement of the packet for each of the second set of one or more service functions (SFs) is calculated by: inspecting, by the second SFF, the mark field corresponding to the packet, reading, for each SF associated with the second SFF, the first clock value as the packet is passed thereto, reading, for each SF associated with the second SFF, the second clock value as the packet is received therefrom, and calculating, by the second SFF, the residence time measurement of the packet in each SF as a function of the first clock value and the second clock value.

In some embodiments, the second SFF calculates for each of the second set of the one or more SFs the residence time measurement of the packet by subtracting the first clock value from the second clock value. In some embodiments, the first clock value and the second clock value are read by the second SFF from a wall clock. In some embodiments, the mark field is located in a network service header (NSH).

In another exemplary embodiment, a method of packet communication is disclosed. The exemplary embodiment comprises determining, for a packet, a service function path comprising a set of one or more service functions (SFs) mapped to a service function forwarder (SFF), wherein each SF is associated with a corresponding Virtual Network Function (VNF), encapsulating the packet in a header, receiving information indicative of a requested residence time measurement for the packet, wherein the residence time provides information about time spend by the packet in each VNF, inspecting, by the SFF, a mark field corresponding to the packet, reading, by each SF, a first clock value as the packet is passed to the VNF, reading, by each SF, a second clock value as the packet is received from the VNF, and calculating, by each SF, the residence time measurement of the packet in the VNF corresponding to each SF as a function of the first clock value and the second clock value.

In some embodiments, the SF calculates the residence time measurement of the packet in the VNF corresponding to the SF by subtracting the first clock value from the second clock value.

In some embodiments, the exemplary method further comprises sending, from the SF to the SFF associated with the SF, the residence time measurement of the packet in the VNF corresponding to each SF, sending, from the SFF to a pre-defined data collector, the calculated residence time measurement of the packet, a description of the SF, a sequence number, and a timestamp. In some embodiments, the first clock value and the second clock value are read by the SF from a wall clock.

In yet another exemplary embodiment, a packet communication system is disclosed comprising one or more computing devices comprising one or more processors configured to perform the operations of: receiving information indicative of a requested residence time measurement for a packet, wherein the residence time provides information about time spend by the packet in a first network function, inspecting, by a service function forwarder (SFF), a mark field corresponding to the packet, reading, by a second network function, a first clock value as the packet is passed to the first network function, reading, by the second network function, a second clock value as the packet is received from the first network function, and calculating, by the second network function, the residence time measurement of the packet in the first network function as a function of the first clock value and the second clock value.

In some embodiments, the first network function is a service function (SF) and the second network function is the SFF. In some embodiments, the SFF calculates for each of the one or more SFs the residence time measurement of the packet by subtracting the first clock value from the second clock value. In some embodiments, the first network function is a virtual network function (VNF) and the second network function is a service function (SF). In some embodiments, the SF calculates the residence time measurement of the packet in the VNF corresponding to the SF by subtracting the first clock value from the second clock value.

DETAILED DESCRIPTION

Figure 1:
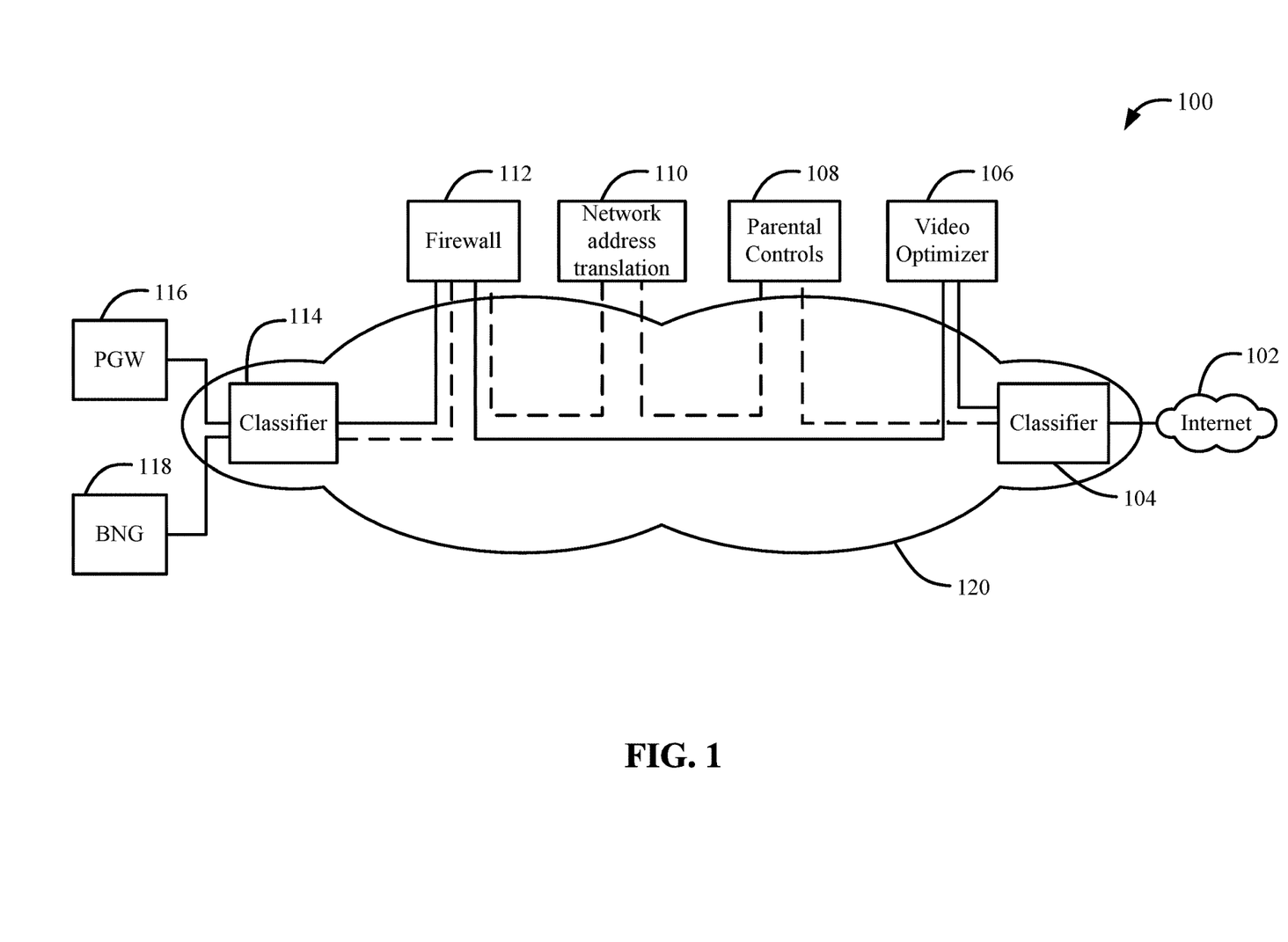
FIG. 1 shows two examples of service function chaining (SFC) in a virtual network function (VNF) environment.

FIG. 1 shows two examples of service function chaining (SFC) in a virtual network function (VNF) environment 100. In some embodiments, each of the two classifiers 104 and 114 may be placed in the same data center as the ingress service function forwarder (not shown) of the service function chain. In a first example, as shown by the solid lines in between the two classifiers 104 and 114, the data traffic received from the Internet 102 is steered through service functions such as video optimizer 106 and firewall 112. The steering of the data traffic may take place in a resource cloud 120, such as a data center or one or more cloud servers. The resource cloud 120 may be public or private or a hybrid of public and private. The data traffic may include Internet Protocol (IP) packets or frames.

In a second example, as shown by the dashed lines between the two classifiers 104 and 114, the data traffic received from the Internet 102 is steered through service functions such as parental controls 108, network address translation 110 and firewall 112. In some implementations, data steered through one or more service functions can be sent to a packet data network gateway 116 to send to mobile networks for mobile devices, such as a smartphone. In other implementations, data steered through one or more service functions can be sent to a broadband network gateway 118 to send to a fixed networks for fixed devices, such as a laptop, a desktop, or a server. In a VNF environment 100, software can be used to set up and tear down different service functions (SFs) as needed.

Understanding the performance of a SFC and how VNFs contribute to the performance of the SFC can assist in the maintenance of services and quality of experience the VNFs are expected to provide. VNF is connected and accessed from SFC via a SF. In some embodiments, the residence time of packets introduced by the service function and VNF instance can be calculated separately. In some other embodiments, the residence time of packets can be measured for the given combination of SF and VNF instance together. A benefit of measuring the residence time is that it allows for measuring load distribution among SFs of the same type. In an exemplary embodiment, a residence time of packets traversing a service function or virtual network function is measured. Thus, the residence time characterizes the processing delay a service function or a virtual network function introduces into a network.

Current technologies to measure the packet residence time in an SF use active methods by specially constructed test packets. Such approach does not provide very accurate measurement because the test packets do not traverse the VNF instance but only the SF that represents it. Also, at higher load level extra packets of the test packets alter behavior of the system thus skewing the measurement. Further, measurement methods that use service data packets cannot guarantee that measurements performed along the SFC is performed on the same packet. That significantly affects accuracy of computing residence time of the SFC end-to-end. The exemplary embodiments in this document overcome the limitation of using special test packets to measure residence time over an SFC. Another benefit of the exemplary embodiments is that it allows for accurate calculation of end to end residence time which can be challenging when using arbitrary selected service data packets.

Figure 2A:
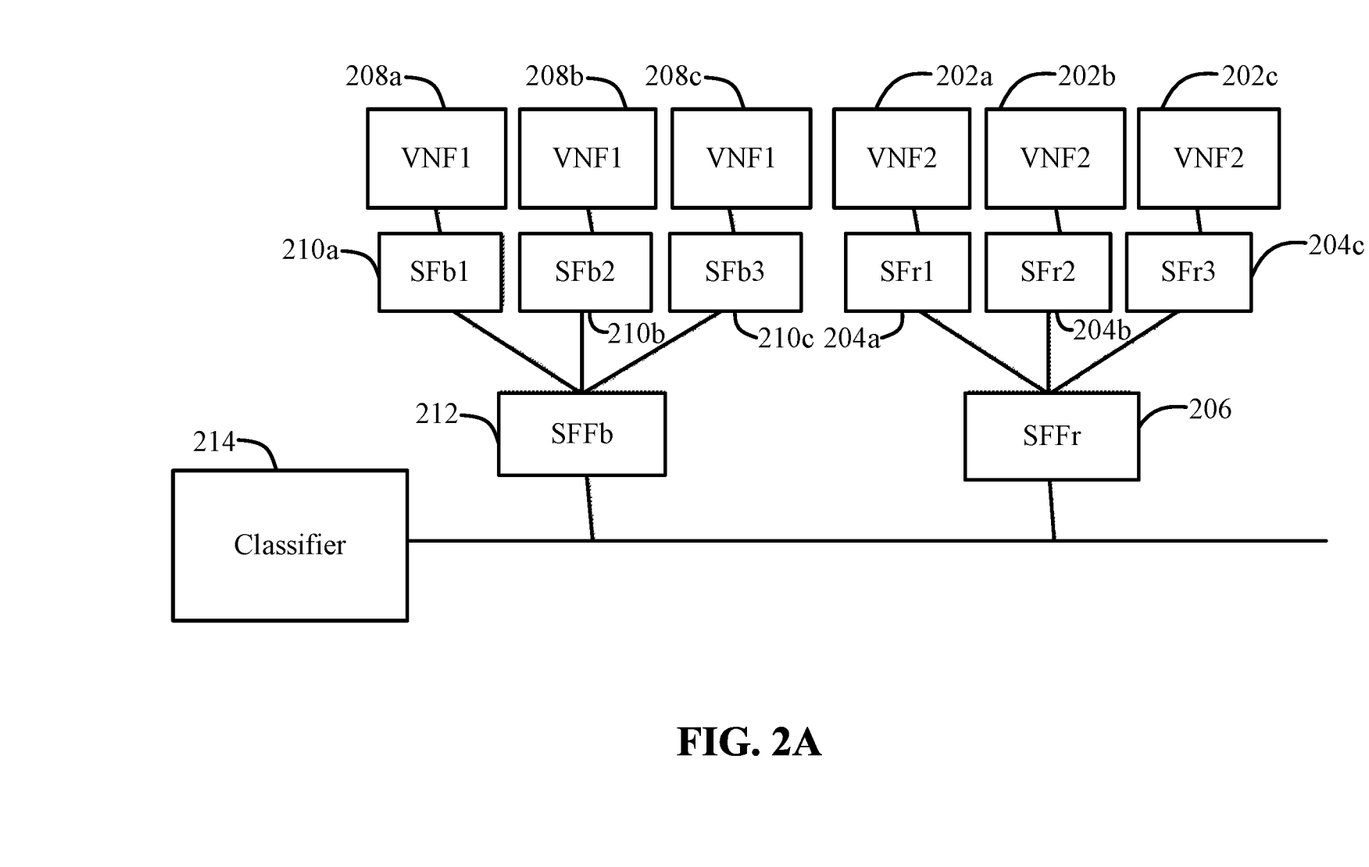
FIG. 2A illustrates an exemplary block diagram of service function chain and virtual network functions.

FIG. 2A shows an exemplary block diagram of service function chain and virtual network functions. A packet mapped to service function may be processed by a VNF. For example, as shown in FIG. 2A, SFb1 210a may be processed by VNF1 208a. SFb 210a-210c and SFr 204a-204c depict different SF types and thus are connected to different type of VNF, VNF1 208a-208c and VNF2 202a-202c respectively. In FIG. 2A, the three instances of VNF1 208a-208c connected to SFb1-SFb3 reflect pool of available VNFs to SFFb for load balancing. In some embodiments, an SF may decode metadata encapsulated with the packet for the VNF. A Service Function Chain (SFC) may be a virtual entity constructed by an ordered set of Service Functions (SFs). For example, a SFC for a packet may include one of the SFrs 204a-204c and one of the SFbs 210a-210c. For instance, a SFC for a packet may include only SFr1 204a. As a further example, a SFC for a packet may include SFb1 210a and SFr2 204b. In another example, an SFC for a packet may include SFb1 210b and SFr3 204c. A Classifier 214 may determine the SFC for a packet.

Figure 2B:
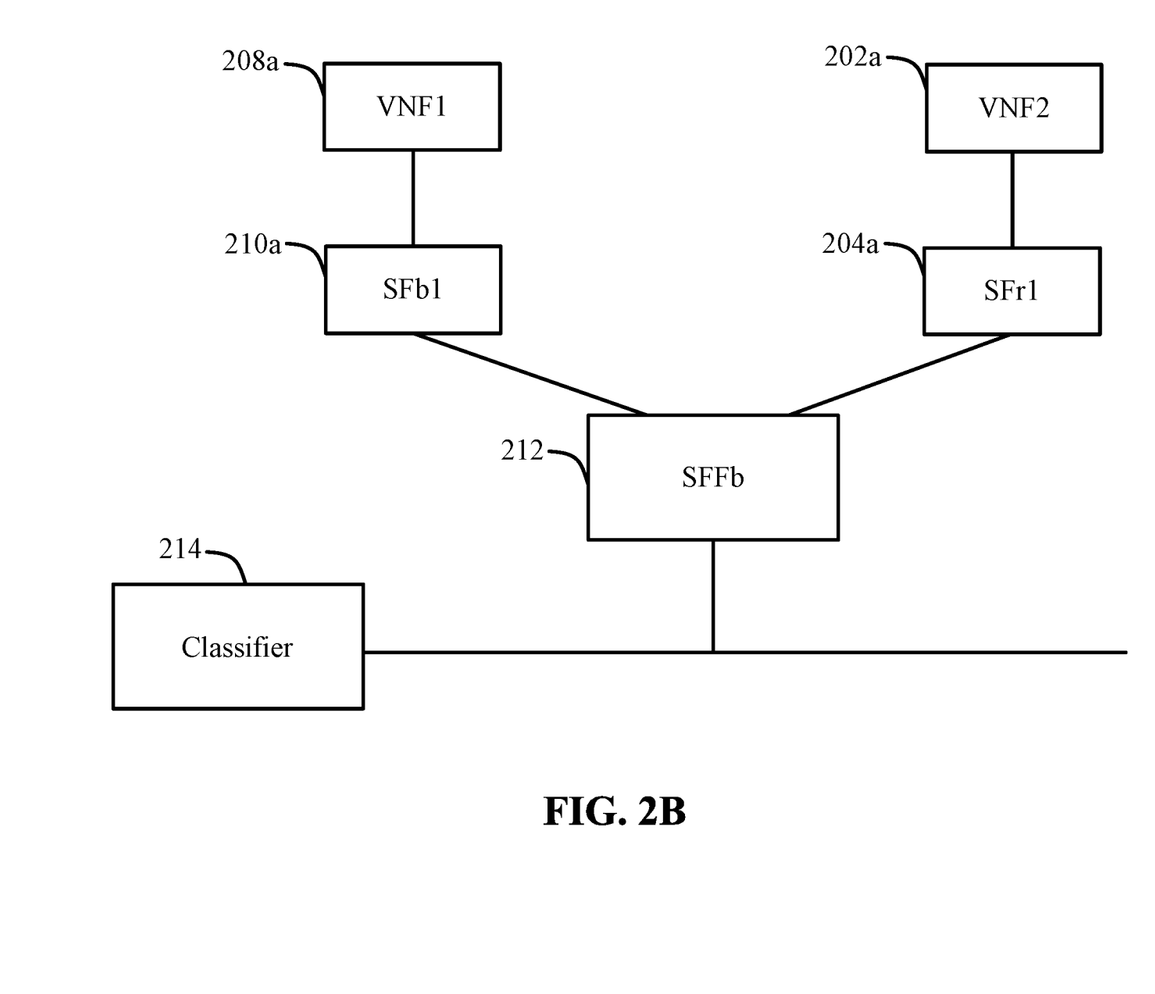
FIG. 2B illustrates another exemplary block diagram of service function chain and virtual network functions.

FIG. 2B shows another exemplary embodiment where different types of SF/VNF may be connected to the same SFF. In FIG. 2B, SFb1 210a may be processed by VNF1 208a and SFr1 204a may be processed by VNF2 202a. In this embodiment, as an example, a SFC for a packet may include SFb1 210a and SFr1 204a. As another example, a SFC for a packet may include SFr1 204a.

An SF is connected to a Service Function Forwarder (SFF). For instance, in FIG. 2A, SFb1-SFb3 210a-210c are connected to SFFb 212, and SFr1-SFr3 204a-204c are connected to SFFr 206. An SF may be mapped to one and only one SFF instance. The traversed ordered list of SFFs and SFs that realizes the SFC is referred as Service Function Path (SFP). SFFs maintain SFP forwarding information. The SFP forwarding information is associated with a Service Path Identifier (SPI) that is used to uniquely identify an SFP. The SFP may not specify specific SF that a packet will traverse but only the functionality that the SF provides. The mapping of SPI to particular instance of SF of the type for SFF may be local and it may be specified or left to SFF. The ordered list of actual SFFs and SFs traversed by a packet is referred as Rendered Service Path (RSP). For example, referring to FIG. 2A, a RSP may include only SFr1 204a where a SFP for a packet includes only SFr. As a further example, a RSP may include SFb1 210a and SFr2 204b where a SFC for a packet may include SFb and SFr.

The ability to measure residence time of packets on each SF 204a-204c and 210a-210c helps to maintain the required quality of the service by distributing services among active VNF instances 202a-202c and 208a-208c, for example, by scaling them up or down to maintain better performance at highest resource efficiency.

Figure 3:
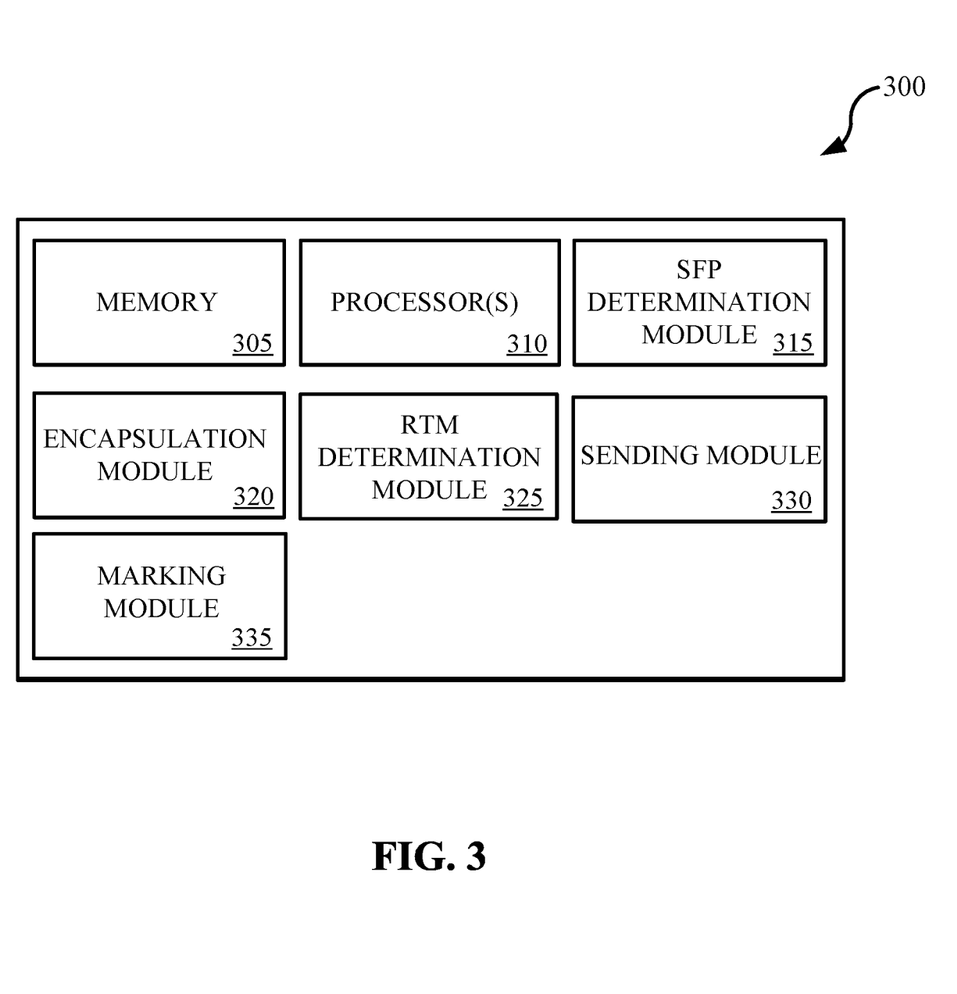
FIG. 3 illustrates a block diagram for a Classifier.

FIG. 3 illustrates a block diagram for a Classifier 300. A Classifier 300 includes a memory 305 and one or more processors 310. In some embodiments, a Classifier may be included in, for example, a router, a switch, a server in a data center, or a server in the cloud on the Internet. A Classifier may include an SFP determination module 315. The SFP determination module 315 inspects one or more packets to determine an SFP for each packets. A Classifier 300 also includes an encapsulation module 320 that encapsulate a packet with, for example, a Network Service Header (NSH). In some embodiments, the encapsulation module 320 encapsulates a packet with a header, such as a Network Service Header (NSH). A NSH includes service path information and optionally metadata that are added to a packet or frame and used to create a service plane. The service path information is related to the SPI and thus SFP. Metadata may provide contextual information about the data packets, and may relate to information such as security, authentication, or status relation.

The Classifier 300 may include a Residence Time Measurement (RTM) Determination Module 325. The RTM Determination Module 325 obtains information about whether RTM has been requested for a packet. The Sending Module 330 obtains the SFC information for a packet from the SFC Determination Module 315 and sends the packet to an SFF associated with the determined SFC. The Classifier 300 may include a marking module 335. If RTM has been requested for the packet the marking module 335 performs the marking operation 408 discussed in the context of the OAM in FIG. 4. In some embodiments, the OAM is a function that may be accessed from the Classifier 300.

Figure 4:
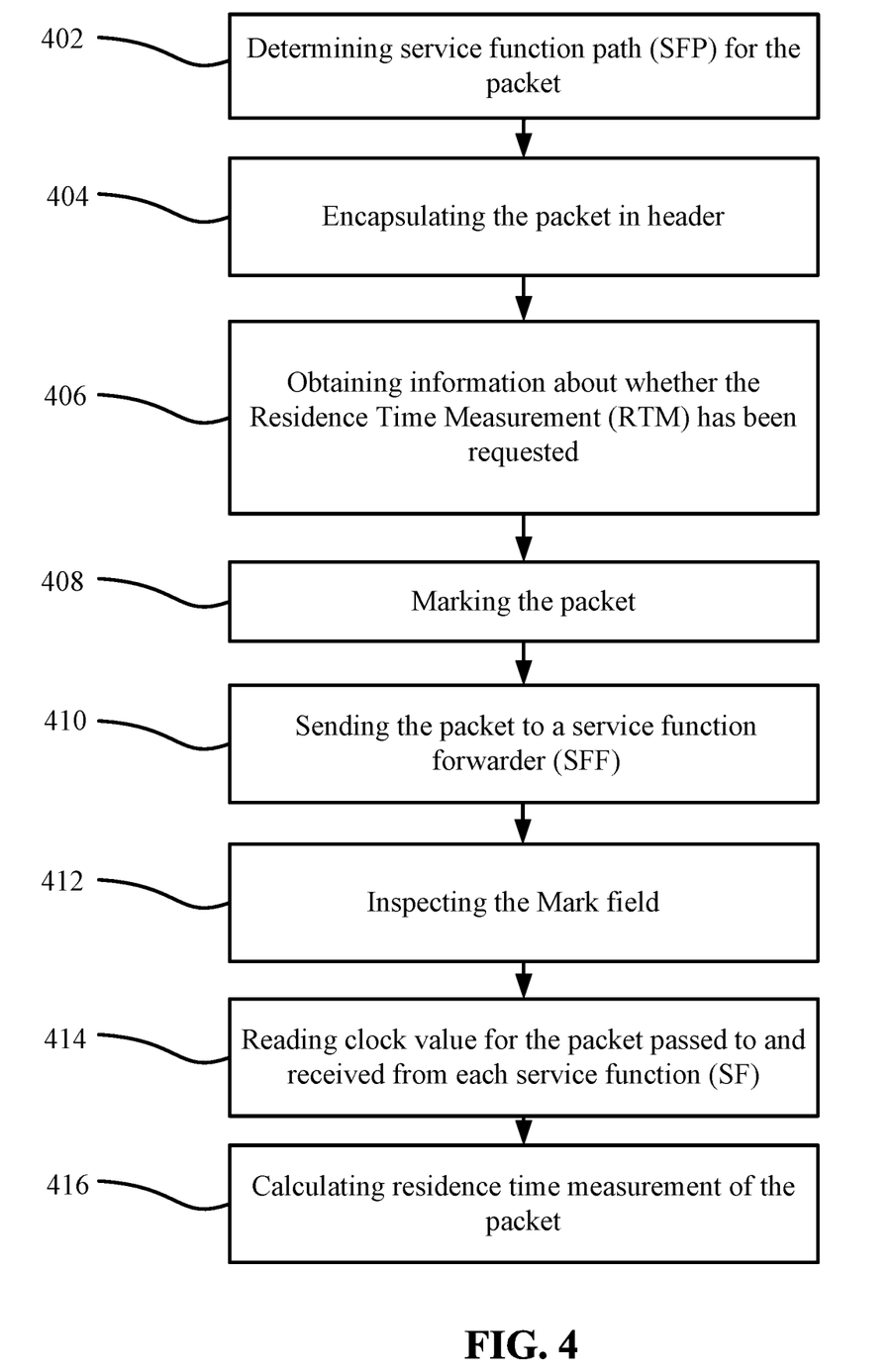
FIG. 4 illustrates an exemplary flowchart for one or more Service Function Forwarders (SFFs) performing residence time measurement for a packet.

FIG. 4 shows an exemplary flowchart to allow the one or more SFFs to perform the residence time measurement for each packet that passes to and is received from each SF instance mapped to each SFF. A benefit of performing residence time measurement at the SFF is that it allows for a system that is easy to manage and is reliable. The packet mapped to a service is inspected by a Classifier as described in FIGS. 2 and 3. Based on the inspection, at the determining operation 402, the Classifier may determine the SFP for the packet, and at the encapsulating operation 404, the Classifier may encapsulate the packet in a header. In some embodiments, the header may be a Network Service Header (NSH). Further, based on the inspection, at the receiving operation 406, the Classifier obtains information about whether the Residence Time Measurement (RTM) has been requested. Request to perform RTM may be one of actions associated with Classifier policy. Request to perform RTM can be configured or updated as part of policy configuration or update by a controller.

At the marking operation 408, if the RTM has been requested, the Operation, Administration and Maintenance (OAM) component marks the packet accordingly. In some embodiment, the OAM may mark every Nth packet starting from a certain time. In some other embodiments, the OAM may mark a packet after a certain interval of time has passed. There could be different policies to select a packet for marking. The marking may not change how the packet treated by the network. In some embodiments, the value of the Mark field may not be used for making forwarding decision or schedule packet processing. OAM may also identify set of protocols, functions to detect defects, failures, identify and localize them as well as to monitor performance.

At the sending operation 410, the Classifier sends or hands the packet to an SFF on the SFP. At the inspecting operation 412, if the RTM has been enabled for the SPI to which the packet belongs to, instances of SFF may inspect the Mark field to find properly marked packets. The Mark field may be located in the NSH Base Header of the packet.

At the clock reading operation 414, for the marked packet, the SFF may read wall clock value as the packet is being passed to and received from one or more SF instance mapped to that SFF and associated with the SFP determined by the Classifier. For each SF associated with the SFF, the SFF reads the wall clock value as the packet is passed to the SF and as the packet is received from the SF. At the calculating operation 416, residence time may be calculated by the SFF by subtracting a first clock value from the second clock value. Thus, in this embodiment, a residence time is calculated per SF instance. In some other embodiments, residence time may be measured per SFF. Thus, the SFF may read the wall clock as the marked packet is received by the SFF and then as it is being transmitted to the next SFF downstream SFP.

An example of one SFF that performs the operation of FIG. 4 is further illustrated. For example, a SFFb 212 of FIG. 2A can measure a residence time of a packet steered through an SFC that includes only SFb1 210a and SFb3 210c. Once SFFb 212 identified the properly marked for RTM packet it reads the wall clock when the packet is passed to SFb1 210a and when it has been returned from SFb1 210a. By subtracting the first value from the second SFFb 212 calculates residence time for SFb1-VNF1 coupling. By repeating these steps for SFb3 210c, SFFb 212 calculates the residence time for SFb3-VNF1 coupling respectively. In some embodiments, to isolate delay introduced by SF component, additional two readings can be performed by the SF—one when the packet is passed to the VNF instance and another when it is received from it. The SF calculates the residence time introduces by VNF and communicates it to its SFF.

Another example of two SFFs that perform the operation of FIG. 4 is further illustrated. For example, a SFFb 212 and SFFr 206 of FIG. 2A can measure an RTM of a packet steered through an SFC that includes only SFb1 210a, SFr1 204a and SFr2 204b. Once SFFb 212 identifies the properly marked for RTM packet it reads the wall clock when the packet is passed to SFb1 210a and when it has been returned from SFb1 210*a*. By subtracting the first value from the second SFFb 212 calculates residence time for SFb1-VNF1 coupling. After the packet is processed by all SFs required by SFP that are local to that SFF, such as the SFFb 212 in this example, the SFF uses SPI to identify the next hop, next SFF for the packet. In this example, SFFb 212 transmits the packet with proper encapsulation towards SFFr 206. Once SFFr 206 identifies the properly marked for RTM packet it reads the wall clock when the packet is passed to SFr1 204*a* and when it has been returned from SFr1 204*a*. By subtracting the first value from the second SFFr 206 calculates residence time for SFr1-VNF2 coupling. By repeating these steps for SFr2 204*b*, SFFr 206 calculates the residence time for SFr2-VNF2 coupling respectively.

Locally calculated residence time values with characteristic information that includes type of SF, SPI and locally generated sequence number and the timestamp may be sent or transmitted from the SFF to pre-defined data collector, such as an out-of-band data collector, to compute the residence time for the entire SFP. In some embodiments, the SFF generates the sequence number to account for the transmitted RTMs and the timestamp is taken when the SFF transmits the RTM results. The pre-defined data collector may be a life cycle orchestration controller that collects, correlates, and analyzes OAM and telemetry information.

Collected measurements, per SF instance as well as for the entire service function chain, may be evaluated by SFC Policy block and actions to improve performance of the service function chain may be taken. Actions may include launching new VNF instances to better share load, or stopping VNF instance to improve resource utilization. In some embodiments, end-to-end residence time can be calculated as sum of all collected measurements. In some other embodiments, the residence time can be measured by collecting timestamp when Classifier transmits the packet and the last in SFC SFF removes NSH encapsulation from the packet. The evaluation of collected measurements may include statistical metrics like mean residence time or percentiles as they better reflect trends. Policy for the SFC Policy block may define which metric and the threshold to use for in and out of defect state with associated actions to be taken.

Figure 5:
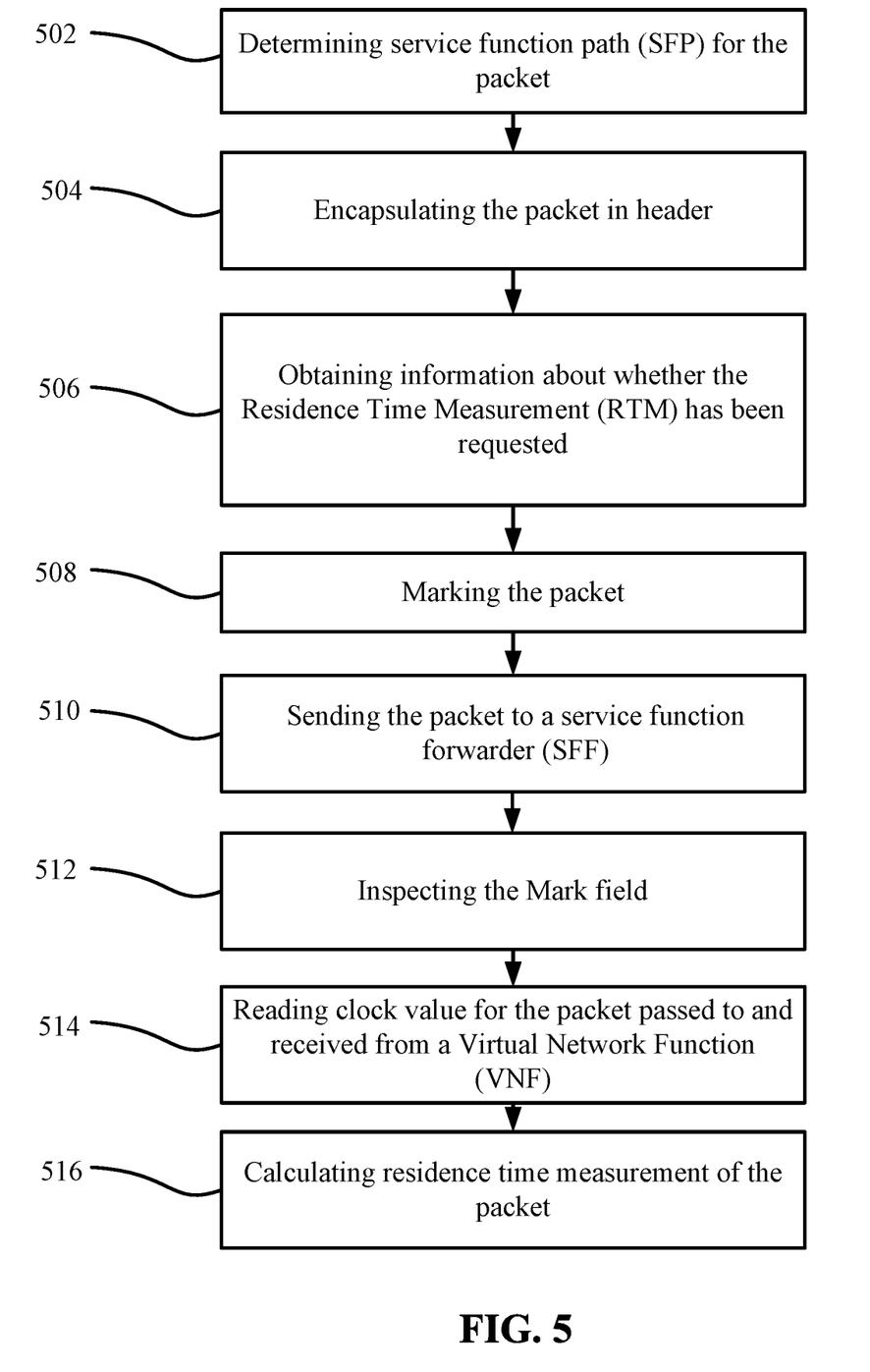
FIG. 5 illustrates another exemplary flowchart for a Service Function (SF) performing the residence time measurement for a packet.

FIG. 5 show another exemplary flowchart to allow a SF to perform the residence time measurement for each packet. A benefit of the SF performing the RTM is to isolate delay and delay variation introduced by the SF from the delay and delay variation introduced by the VNF. The packet mapped to a service is inspected by a Classifier as described in FIGS. 2 and 3. Based on the inspection, at the determining operation 502, the Classifier may determine the SFC for the packet, and at the encapsulating operation 504, the Classifier may encapsulate the packet in a header. In some embodiments, the header may be a Network Service Header (NSH). Further, based on the inspection, at the receiving operation 506, the Classifier obtains information about whether the Residence Time Measurement (RTM) has been requested. Request to perform RTM may be one of actions associated with Classifier policy. Request to perform RTM can be configured or updated as part of policy configuration or update by a controller.

At the marking operation 508, if the RTM has been requested, the Operation, Administration and Maintenance (OAM) component marks the packet accordingly. In some embodiment, the OAM may mark every Nth packet starting from a certain time. In some other embodiments, the OAM may mark a packet after a certain internal of time has passed.

There could be different policies to select a packet for marking. The marking may not change how the packet treated by the network. In some embodiments, the value of the Mark field may not be used for making forwarding decision or schedule packet processing. OAM may also identify set of protocols, functions to detect defects, failures, identify and localize them as well as to monitor performance.

At the sending operation 510, the Classifier sends or hands the packet to an SFF on the SFC. At the inspecting operation 512, if the RTM has been enabled for the Service Path Identifier (SPI) to which the packet belongs to, instances of SFF may inspect the Mark field to find properly marked packets. The Mark field may be located in the NSH Base Header of the packet.

At the clock reading operation 514, for the marked packet, the SF may read wall clock value as the packet is being passed to and received from a VNF associated with that SF. Each SF reads the wall clock value as the packet is passed to the VNF and as the packet is received from the VNF. At the calculating operation 516, residence time may be calculated by the SF by subtracting a first clock value from the second clock value. In this embodiment, the SF can measure residence time of the VNF instance and include the residence time value with the packet returned to SFF. Subsequently, the SFF exports the RTM metrics to the data collector.

For the embodiment where the SF performs the RTM, locally calculated residence time values with characteristic information that includes type of SF, SPI and locally generated sequence number and the timestamp may be sent or transmitted from the SFF to pre-defined data collector to compute the residence time for the entire SFC. Collected measurements, per SF instance as well as for the entire SFC, may be evaluated by SFC Policy block and actions to improve performance of the SFC may be taken. Actions may include launching new VNF instances to better share load, or stopping VNF instance to improve resource utilization.

A Mark field in an NSH base header may be designated for an alternate marking performance measurement method. The Mark field may be used only for the performance measurement of data traffic in SFC layer. Because setting of the field to any value does not affect forwarding and/or quality of service treatment of a packet, the alternate marking method in SFC layer can be viewed as an example of passive performance measurement method. The Mark field may be a two bit long field where the least significant bit, known as S Flag may be used for a single mark method and the most significant bit, known as D flag, may be used for a double mark method. Single Mark method allows measurement of one-way delay for the monitored flow. Double Mark method allows measurement of minimum and maximum delays for the monitored flow but it requires more nodal and network resources.

The marking method can be used in the SFC. Any combination of markings, Loss or Delay, can be applied to a service flow by any component of the SFC at either ingress or egress point to perform node, link, segment or end-to-end measurement to detect performance degradation defect and localize it efficiently.

Using the marking method a component of the SFC may create distinct sub-flows in the particular service traffic over SFC. Each sub-flow may consist of consecutive blocks that are unambiguously recognizable by a monitoring point at any component of the SFC and can be measured to calculate packet loss and/or packet delay metrics.

Figure 6:
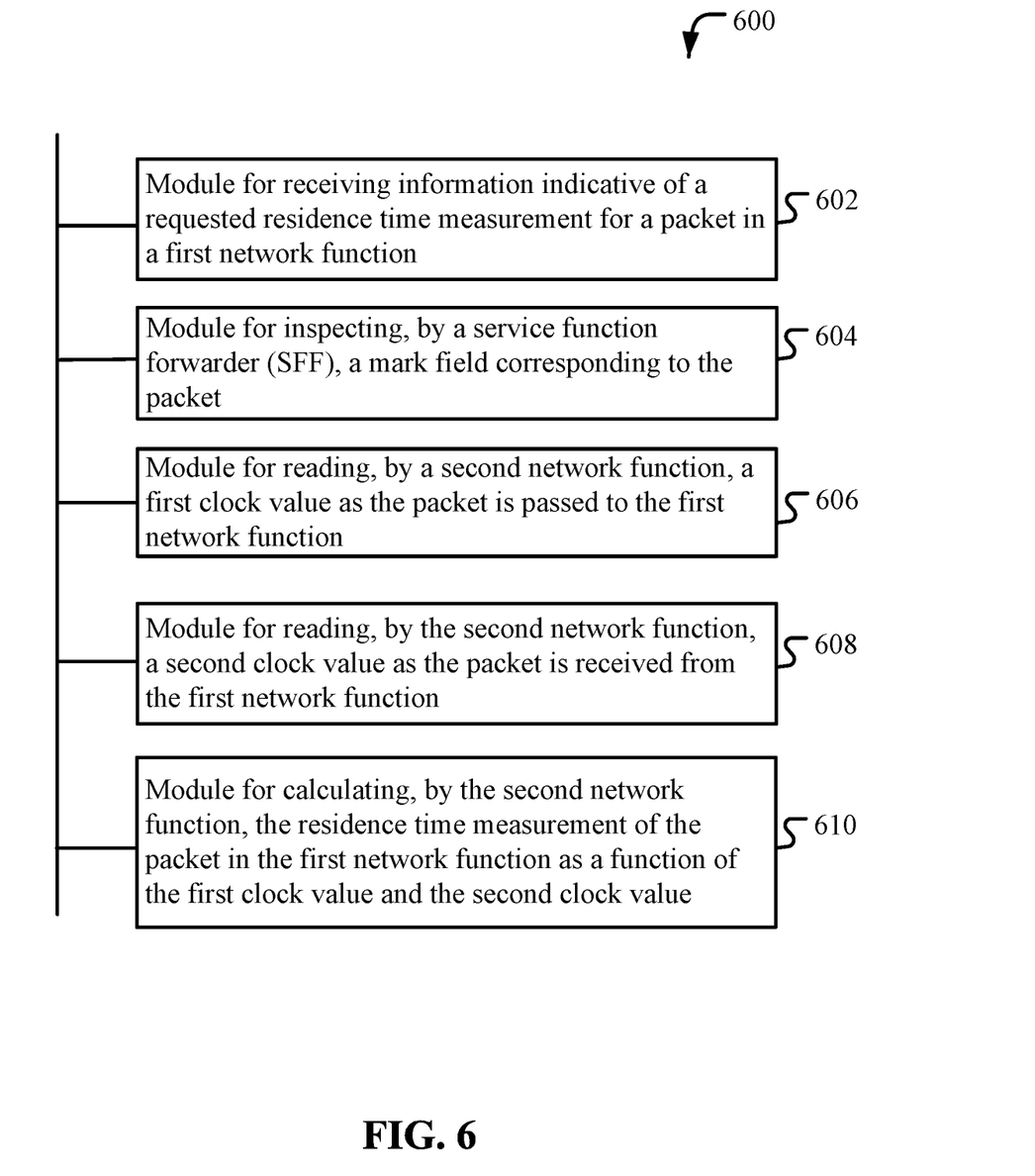
FIG. 6 shows a block diagram representation of one or more computing devices configured to perform operations associated with residence time measurements.

FIG. 6 shows a block diagram representation of one or more computing devices 600 configured to perform operations associated with residence time measurements. In an exemplary embodiment, the one or more computing devices 600 comprise one or more processors configured to perform several operations. The module 602 receives information indicative of a requested residence time measurement for a packet. The residence time provides information about time spend by the packet in a first network function. The module 604 inspects, by a service function forwarder (SFF), a mark field corresponding to the packet. The module 606 reads, by a second network function, a first clock value as the packet is passed to the first network function. The module 608 reads, by the second network function, a second clock value as the packet is received from the first network function. The module 610 calculates, by the second network function, the residence time measurement of the packet in the first network function as a function of the first clock value and the second clock value.

Single Mark Enabled Measurement

Marking can be applied to delineate blocks of packets based either on equal number of packets in a block or based on equal time interval. The latter method offers better control as it allows better account for capabilities of downstream nodes to report statistics related to batches of packets and, at the same time, time resolution that affects defect detection interval. If the Single Mark measurement used, then the D flag can be set to zero on transmit and may be ignored by monitoring point. In some embodiments, the Classifier performs the marking operation. In some other embodiments, any other device in the SFC performs the marking operation. A monitoring point is a function that checks the value of the Mark field when the measurement is enabled. The monitoring point function may also maintain the state of the previous value of the Mark field to recognize the change. The S flag is used to create alternate flows to measure the packet loss by switching value of the S flag every N-th packet or at certain time intervals. Delay metrics may be calculated with the alternate flow using any of the following methods.

First/Last Packet Delay calculation: whenever the marking, e.g., value of S flag changes, a component of the SFC can store the timestamp of the first/last packet of the block. The component of the SFC may be either SFF or SF. The timestamp can be compared with the timestamp of the packet that arrived in the same order through a monitoring point at downstream component of the SFC to compute packet delay. In some embodiments, the downstream component of the SFC may be either SFF or SF, depending on the location of the upstream monitoring point. Because timestamps collected based on order of arrival this method is sensitive to packet loss and re-ordering of packets.

Average Packet Delay calculation: an average delay can be calculated by considering the average arrival time of the packets within a single block. A component of the SFC, such as either SFF or SF, may collect timestamps for each packet received within a single block. Average of the timestamp is the sum of all the timestamps divided by the total number of packets received. Then difference between averages calculated at two monitoring points is the average packet delay on that segment. This method is robust to out of order packets and also to packet loss (only a small error may be introduced). This method only provides single metric for the duration of the block and it does not give the minimum and maximum delay values. This single metric feature can be overcome by reducing the duration of the block by means of a highly optimized implementation of the method.

Double Mark Enablement Measurement

Double Mark method allows measurement of minimum and maximum delays for the monitored flow but it may require more nodal and network resources. If the Double Mark method used, then the S flag may be used to create the alternate flow, e.g., mark larger batches of packets. The D flag may be used to mark single packets to measure delay jitter.

The first marking (S flag alternation) is used for packet loss and also for average delay measurement. The second marking (D flag is put to one) creates a new set of marked packets that are fully identified over the SFC, so that a component such as SFF or SF can store the timestamps of these packets; these timestamps can be compared with the timestamps of the same packets on another component of the SFC, such as another SFF or SF, to compute packet delay values for each packet. The number of measurements can be increased by changing the frequency of the second marking. To avoid out of order issues, the frequency of the second marking should not be too high. This method is useful to have not only the average delay but also the minimum and maximum delay values and, in wider terms, to know more about the statistic distribution of delay values.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of packet communication, comprising:
determining, for a packet, a service function path comprising a set of one or more service functions (SFs) mapped to a service function forwarder (SFF);
encapsulating the packet in a header;
including a value in a mark field included in the header due to receiving information indicative of a requested residence time measurement for the packet, wherein the residence time provides information about time spend by the packet in each SF, and wherein the mark field indicates that the residence time measurement is requested;
inspecting, by the SFF, the mark field corresponding to the packet;
reading, based on the inspecting and for each SF associated with the SFF, a first clock value as the packet is passed thereto;
reading, based on the inspecting and for each SF associated with the SFF, a second clock value as the packet is received therefrom; and
calculating, by the SFF, the residence time measurement of the packet in each SF as a function of the first clock value and the second clock value.

2. The method of claim 1, wherein the SFF calculates for each of the one or more SFs the residence time measurement of the packet by subtracting the first clock value from the second clock value.

3. The method of claim 1, wherein the SFF sends to a pre-defined data collector the calculated residence time measurement of the packet, a description of each of the one or more SFs, a sequence number, and a timestamp.

4. The method of claim 1, wherein the first clock value and the second clock value are read by the SFF from a wall clock.

5. The method of claim 1, wherein the header is a network service header (NSH).

6. The method of claim 5, wherein the mark field is located in the NSH.

7. The method of claim 1, further comprising:
marking the packet;
sending the packet with the marking from a Classifier to the SFF.

8. The method of claim 1, wherein
the service function path comprising a second set of one or more service functions (SFs) mapped to a second service function forwarder (SFF), and
the residence time measurement of the packet for each of the second set of one or more service functions (SFs) is calculated by:
inspecting, by the second SFF, the mark field corresponding to the packet;
reading, for each SF associated with the second SFF, the first clock value as the packet is passed thereto;
reading, for each SF associated with the second SFF, the second clock value as the packet is received therefrom; and
calculating, by the second SFF, the residence time measurement of the packet in each SF as a function of the first clock value and the second clock value.

9. The method of claim 8, wherein the second SFF calculates for each of the second set of the one or more SFs the residence time measurement of the packet by subtracting the first clock value from the second clock value.

10. The method of claim 8, wherein the first clock value and the second clock value are read by the second SFF from a wall clock.

11. The method of claim 8, wherein the mark field is located in a network service header (NSH).

12. A method of packet communication, comprising:
determining, for a packet, a service function path comprising a set of one or more service functions (SFs) mapped to a service function forwarder (SFF), wherein each SF is associated with a corresponding Virtual Network Function (VNF);
encapsulating the packet in a header;
including a value in a mark field included in the header due to receiving information indicative of a requested residence time measurement for the packet, wherein the residence time provides information about time spend by the packet in each VNF, and wherein the mark field indicates that the residence time measurement is requested;
inspecting, by the SFF, the mark field corresponding to the packet;
reading, based on the inspecting and by each SF, a first clock value as the packet is passed to the VNF;
reading, based on the inspecting and by each SF, a second clock value as the packet is received from the VNF; and
calculating, by each SF, the residence time measurement of the packet in the VNF corresponding to each SF as a function of the first clock value and the second clock value.

13. The method of claim 12, wherein the SF calculates the residence time measurement of the packet in the VNF corresponding to the SF by subtracting the first clock value from the second clock value.

14. The method of claim 12, further comprising:
sending, from the SF to the SFF associated with the SF, the residence time measurement of the packet in the VNF corresponding to each SF; and
sending, from the SFF to a pre-defined data collector, the calculated residence time measurement of the packet, a description of the SF, a sequence number, and a timestamp.

15. The method of claim 12, wherein the first clock value and the second clock value are read by the SF from a wall clock.

16. The method of claim 12, wherein the header is a network service header (NSH).

17. The method of claim 16, wherein the mark field located in the network service header (NSH).

18. The method of claim 12, further comprising:
marking the packet; and
sending the packet with the marking from a Classifier to the SFF.

19. A packet communication system, comprising:
one or more computing devices comprising one or more processors configured to perform the operations of:
including a value in a mark field included in a header of a packet due to receiving information indicative of a requested residence time measurement for the packet, wherein the residence time provides information about time spend by the packet in a first network function, and wherein the mark field indicates that the residence time measurement is requested;
inspecting, by a service function forwarder (SFF), the mark field corresponding to the packet;
reading, based on the inspecting and by a second network function, a first clock value as the packet is passed to the first network function;
reading, based on the inspecting and by the second network function, a second clock value as the packet is received from the first network function; and
calculating, by the second network function, the residence time measurement of the packet in the first network function as a function of the first clock value and the second clock value.

20. The system of claim 19, wherein the first network function is a service function (SF) and the second network function is the SFF.

21. The system of claim 20, wherein the SFF calculates for each of the one or more SFs the residence time measurement of the packet by subtracting the first clock value from the second clock value.

22. The system of claim 19, wherein the first network function is a virtual network function (VNF) and the second network function is a service function (SF).

23. The system of claim 22, wherein the SF calculates the residence time measurement of the packet in the VNF corresponding to the SF by subtracting the first clock value from the second clock value.

24. The system of claim 19, wherein the mark field is located in a network service header (NSH).

25. The system of claim 19, wherein the first clock value and the second clock value are wall clock values.

* * * * *